Sept. 2, 1958  G. L. FAHLGREN  2,850,589
COMBINATION IGNITION AND SAFETY SWITCH
Filed Nov. 19, 1956

Gordon L. Fahlgren
INVENTOR.

BY *Clarence A. O'Brien*
*and Harvey B. Jacobson*
Attorneys

United States Patent Office 2,850,589
Patented Sept. 2, 1958

2,850,589

COMBINATION IGNITION AND SAFETY SWITCH

Gordon L. Fahlgren, Crockett, Calif., assignor of one-half to Leonard S. Fahlgren, Washburn, N. Dak.

Application November 19, 1956, Serial No. 622,912

8 Claims. (Cl. 200—61.47)

This invention relates in general to new and useful improvements in switch construction and more specifically to a combination ignition and safety switch for vehicles.

It is not only desirable to turn off the ignition of vehicles when the internal combustion engine of a vehicle is to be stopped, but also in the event the vehicle should overturn or should suddenly strike a relatively immovable object. This is particularly true in the case of tractors, which have a tendency to turn over both sideways and backwards. It is therefore the primary object of this invention to provide an improved ignition switch which is so constructed whereby it also functions as a safety switch to automatically turn off the ignition of an internal combustion engine upon the tilting of a tractor either forwardly or rearwardly to a predetermined angle in order to prevent overturning of the tractor. The safety switch will also function upon the overturning sideways of a vehicle.

Another object of this invention is to provide an improved ignition switch which also functions as a safety switch, the switch including primarily an insulated body member having formed therein a pocket, the pocket having positioned therein ends of wires forming parts of the ignition system, the ends of the wires being spaced apart and being selectively electrically connected by means of a liquid electrical conductor, the conductor being movable away from the wires by rotating the body member to move the liquid conductor to other parts of the pocket.

Another object of this invention is to provide an improved combination ignition and safety switch, the switch being of a relatively simple construction and formed of readily obtainable materials so as to be of such a nature whereby the manufacture thereof is economically feasible.

A further object of this invention is to provide an improved ignition switch, the ignition switch being so constructed whereby it will also function as a safety switch, the switch including primarily a body member which is mounted for selective rotation, the body member having formed therein a pocket, the pocket being generally of an inverted pear-shaped outline and normally sloping upwardly and rearwardly, there being positioned in the lower part of the pocket ends of ignition wires, the wires being bridged by a liquid conductor when the ignition switch is in an "on" position, and the liquid conductor being disposed in other portions of the pocket when the switch is in an open position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
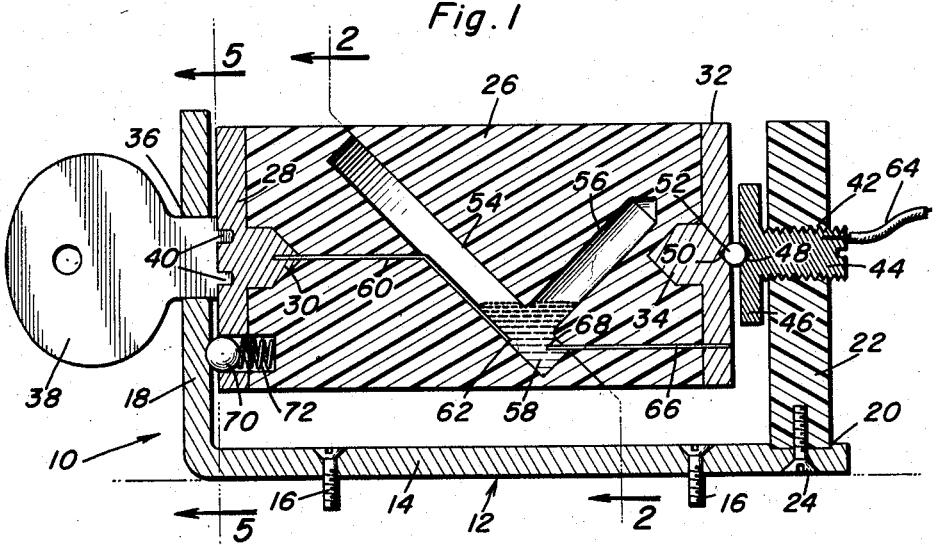
Figure 1 is a vertical sectional view taken through the ignition switch which is the subject of this invention and shows the general details thereof, the switch being illustrated in an "on" position.

Referring now to the drawings in detail, it will be seen that there is illustrated the combination ignition and safety switch which is the subject of this invention, the switch being referred to in general by the reference numeral 10. The switch 10 includes a mounting bracket which is referred to in general by the reference numeral 12. The mounting bracket 12 includes a base 14 which is secured by means of suitable fasteners 16 to a convenient part of a vehicle. Formed integral with the base 14 and extending upwardly therefrom at the rear end thereof is a support 18.

The forward portion of the base 14 is recessed as at 20 and has seated therein an upstanding forward support 22. The forward support 22 is formed of a plastic, non-conductive material and is secured to the base 14 by means of suitable fasteners 24.

Figure 2:
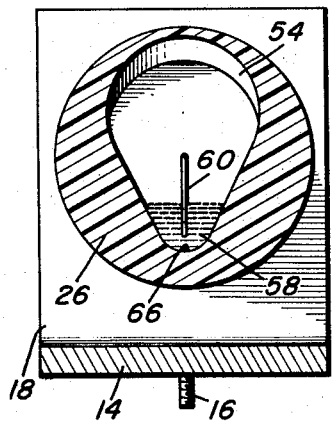
Figure 2 is a transverse sectional view taken substantially upon the plane indicated by the section line 2—2 of Figure 1 and shows generally the outline of the pocket of the switch member and the relationship of the wires and liquid conductor disposed therein.

The switch 10 also includes an elongated body member 26. The body member 26 is formed of a non-conductive, plastic material and is preferably circular in cross section as is best illustrated in Figure 2. Disposed in the rear end of the body member 26 is an end cap 28. The end cap 28 includes a central projection 30 which projects into an end of the body member 26 and secures the end cap 28 thereto. The opposite end of the body member 26 is provided with a forward end cap 32 which includes a central projection 34 projecting into the body member 26 and securing the end cap 32 thereto.

Figure 5:
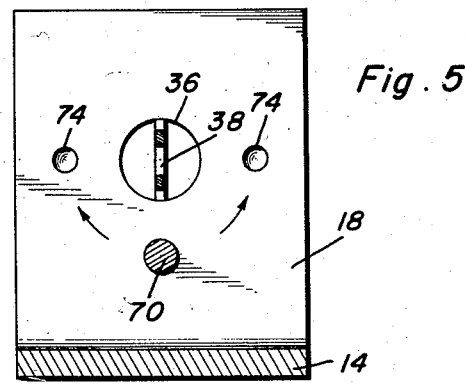
Figure 5 is a vertical sectional view taken substantially upon the plane indicated by the section line 5—5 of Figure 1 and shows the arrangement of recesses in the mounting bracket for receiving a ball detent to retain the body member in a selected position.

Referring now to Figures 1 and 5 in particular, it will be seen that the rear support 18 is provided with a circular opening 36. Disposed in the circular opening 36 is a portion of a key 38. The key 38 is provided at its forward end with prongs 40 which project into the end cap 28 and which serve to support the rear end of the body member 26 for rotation relative to the mounting bracket 12.

The support 22 is provided with an internally threaded bore 42 which is aligned with the opening 36. Threadedly engaged in the bore 42 is a threaded stem portion 44 of a support member 46. The rear end of the support member 46 is enlarged and has a relatively small conical bore 48. A similar conical bore 50 is formed in the end cap 32 in alignment with the conical bore 48. Disposed in the conical bores 48 and 50 is a ball 52 which serves to support the forward end of the body member 26 for rotation. The support member 46 is adjustable relative to the support 22 so that the body member 26 is properly positioned with respect to the mounting bracket 12.

Formed in the body member 26 is a pocket 54. The pocket 54 is of inverted pear shape in outline, as is best illustrated in Figure 2, and slopes upwardly and rearwardly. Communicating with the lower part of the pocket 54 is an upwardly and forwardly sloping extension in the form of a bore 56. Disposed in the lower part of the pocket 54 is a liquid electric conductor, the conductor being preferably mercury and being referred to by the reference numeral 58.

Extending through the body member 26 and electrically connected to the projection 30 of the end cap 28 is a wire 60. The wire 60 extends down through the pocket 54 to a lower part thereof and terminates in an end 62. It is to be understood that the wire 60 forms a part of the ignition system, inasmuch as it is grounded through the mounting bracket 12.

Connected to the support member 46 is a wire 64. The wire 64 will be considered a "hot" wire and is electrically connected to the end cap 32 through the support member 46 and the ball 52. Extending from the end cap 52 into a lower part of the pocket 54 is a wire 66. The wire 66 has an end 68 projecting into the pocket 54 in spaced relation from the end 62 of wire 60.

Figure 3:
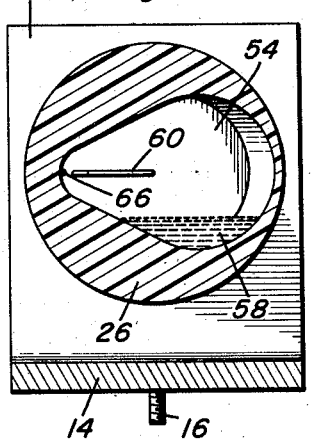
Figure 3 is a sectional view similar to Figure 2 and shows the body member of the switch rotated to a first "off" position.
Figure 4:
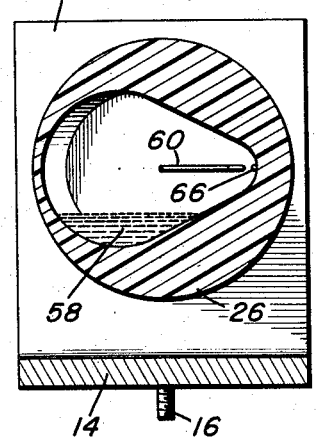
Figure 4 is a vertical sectional view similar to Figure 2 and shows the body member rotated to a second "off" position.

When the pocket 54 is in an upright position, as is illustrated in Figure 2, the liquid conductor 58 bridges the ends 62 and 68 and forms an electrical circuit therebetween. However, when the body member 26 is rotated 90 degrees, either to the left or right, as is illustrated in Figures 3 and 4, the liquid conductor 58 flows into other parts of the pocket 54 away from the wires 60 and 66 and thus opens the electrical circuit between the wires 60 and 66.

In order that the switch 10 may be selectively retained in an "on" and an "off" position, there is carried by the end cap 28 a ball detent 70 which is urged inwardly by a spring 72. Formed in the forward surface of the support 18 is a plurality of sockets 74 selectively receiving the ball detent 70 so as to lock the end cap 28 relative to the support 18.

It is pointed out at this time that the switch 10 functions not only by rotating the body member 26, but will also function should the vehicle on which it is mounted overturn. For example, should the vehicle overturn either to the right or the left, the body member 26 will assume a position such as that shown in Figures 3 and 4. On the other hand, should the vehicle have a tendency to overturn rearwardly, such as in the case of tractors, prior to the actual overturning, the liquid conductor 58 will flow rearwardly into the pocket 54 away from the wire end 68 and thus break the ignition circuit. On the other hand, should the vehicle tilt forwardly too much, the liquid conductor 58 will flow forwardly into the extension bore 56 and away from the wire end 62.

As is illustrated in the drawings, the pocket 54 is generally of a pear shape outline. The purpose of this particular configuration of the pocket 54 is to prevent the accidental opening of the ignition circuit of a vehicle, such as an automobile or tractor, when the same is running down a rough road. If it were not for this particular shape of the pocket 54, the bouncing effect imparted to the vehicle body would cause the conductive liquid 58 to move away from the wire end 68 and thus break the ignition circuit. Since the purpose of the safety ignition switch is only to break the ignition circuit at the times described above, it will be readily apparent that it is undesirable that any road shock should break the ignition circuit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination ignition and safety switch comprising a mounting bracket, an elongated body member, said body member being formed of an insulating material, end caps on said body member forming terminals, one of said end caps being grounded to said mounting bracket, the other of said end caps being insulated relative to said mounting bracket, means carried by said mounting bracket engaging said end caps for rotatably mounting said body member, said means including a key-like member interlocked with one of said end caps and rotatably journaled in said mounting bracket, said key-like member projecting beyond said mounting bracket and forming an operator for rotating said body member, a pocket in said body member, first and second wires positioned in said body member and having ends disposed in said pocket in spaced relation, other ends of said wires being connected to said end caps, and a liquid electric conductor disposed in said pocket and selectively bridging said wires.

2. A combination ignition and safety switch comprising a mounting bracket, an elongated body member, said body member being formed of an insulating material, end caps on said body member forming terminals, one of said end caps being grounded to said mounting bracket, the other of said end caps being insulated relative to said mounting bracket, means carried by said mounting bracket engaging said end caps for rotatably mounting said body member, a pocket in said body member, first and second wires positioned in said body member and having ends disposed in said pocket in spaced relation, other ends of said wires being connected to said end caps, and a liquid electric conductor disposed in said pocket and selectively bridging said wires, releasable latch means extending between one of said end caps and said mounting bracket retaining said body member in a selected position.

3. A combination ignition and safety switch comprising a mounting bracket, an elongated body member, said body member being formed of an insulating material, end caps on said body member forming terminals, one of said end caps being grounded to said mounting bracket, the other of said end caps being insulated relative to said mounting bracket, means carried by said mounting bracket engaging said end caps for rotatably mounting said body member, a pocket in said body member, first and second wires positioned in said body member and having ends disposed in said pocket in spaced relation, other ends of said wires being connected to said end caps, and a liquid electric conductor disposed in said pocket and selectively bridging said wires, said pocket being generally of an inverted pear shape.

4. A combination ignition and safety switch comprising a mounting bracket, an elongated body member, said body member being formed of an insulating material, end caps on said body member forming terminals, one of said end caps being grounded to said mounting bracket, the other of said end caps being insulated relative to said mounting bracket, means carried by said mounting bracket engaging said end caps for rotatably mounting said body member, a pocket in said body member, first and second wires positioned in said body member and having ends disposed in said pocket in spaced relation, other ends of said wires being connected to said end caps, and a liquid electric conductor disposed in said pocket and selectively bridging said wires, said body member normally being mounted in a horizontal position, said pocket sloping upwardly and rearwardly, whereby overturning and impact will cause movement of said liquid away from said wires, said pocket being generally of an inverted pear shape.

5. A combination ignition and safety switch comprising a mounting bracket, an elongated body member, said body member being formed of an insulating material, end caps on said body member forming terminals, one of said end caps being grounded to said mounting bracket, the other of said end caps being insulated relative to said mounting bracket, means carried by said mounting bracket engaging said end caps for rotatably mounting said body member, a pocket in said body member, first and second wires positioned in said body member and having ends disposed in said pocket in spaced relation, other ends of said wires being connected to said end caps, and a liquid electric conductor disposed in said pocket and selectively bridging said wires, said pocket being generally of an inverted pear shape, said pocket including a forwardly and upwardly directed extension.

6. A combination ignition and safety switch comprising a mounting bracket, an elongated body member, said body member being formed of an insulating material, end caps on said body member forming terminals, one of said end caps being grounded to said mounting bracket, the other of said end caps being insulated relative to said mounting bracket, means carried by said mounting bracket engaging said end caps for rotatably mounting said body member, a pocket in said body member, first and second wires positioned in said body member and having ends disposed in said pocket in spaced relation, other ends of said wires being connected to said end caps, and a liquid electric conductor disposed in said pocket and selectively bridging said wires, said body member normally being mounted in a horizontal position, said pocket sloping upwardly and rearwardly, whereby overturning and impact will cause movement of said liquid away from said wires, said pocket being generally of an inverted pear shape, said pocket including a forwardly and upwardly directed extension.

7. A combination ignition and safety switch comprising a mounting bracket, said mounting bracket including a base plate and upstanding end flanges, one of said end flanges being formed of metal and being grounded and the other of said end flanges being insulated, an elongated body member disposed between said end flanges, said body member being formed of an insulating material, metallic end caps on said body member forming terminals, a key-like member rotatably journaled in the grounded one of said end flanges and interlocked with one of said end caps for both rotatably mounting said end cap and grounding said end cap, said key-like member projecting beyond said mounting bracket to facilitate rotation and positioning of said one end cap, the other of said end caps being rotatably journaled on a trunnion carried by the insulated one of said end flanges, said trunnion functioning as a wire connector, a pocket in sad body member, first and second wires positioned in said body member and having ends disposed in said pocket in spaced relation, other ends of said wires being connected to said end caps, and a liquid electric conductor disposed in said pocket, and selectively bridging said wires.

8. A combination ignition and safety switch comprising a mounting bracket, said mounting bracket including a base plate and upstanding end flanges, one of said end flanges being formed of metal and being grounded and the other of said end flanges being insulated, an elongated body member disposed between said end flanges, said body member being formed of an insulating material, metallic end caps on said body member forming terminals, a key-like member rotatably journaled in the grounded one of said end flanges and interlocked with one of said end caps for both rotatably mounting said end cap and grounding said end cap, said key-like member projecting beyond said mounting bracket to facilitate rotation and positioning of said one end cap, the other of said end caps being rotatably journaled on a trunnion carried by the insulated one of said end flanges, said trunnion functioning as a wire connector, a pocket in said body member, first and second wires positioned in said body member and having ends disposed in said pocket in spaced relation, other ends of said wires being connected to said end caps, and a liquid electric conductor disposed in said pocket and selectively bridging said wires, and a releasable detent-type latch extended between one of said end caps and one of said end flanges for retaining said body member in a selected rotated position.

References Cited in the file of this patent

UNITED STATES PATENTS

| | | |
|---|---|---|
| 2,453,783 | Claypool | Nov. 16, 1948 |
| 2,723,321 | Aaseby | Nov. 8, 1955 |